UNITED STATES PATENT OFFICE.

FERDINAND SPRINGMÜHL, OF LONDON, ENGLAND, ASSIGNOR TO THE AMERICAN CONCENTRATED MUST COMPANY, OF SAN FRANCISCO, CALIFORNIA.

PRESERVING GRAPE MUST AND SKINS.

SPECIFICATION forming part of Letters Patent No. 380,463, dated April 3, 1888.

Application filed September 14, 1887. Serial No. 249,723. (No specimens.)

*To all whom it may concern:*

Be it known that I, FERDINAND SPRING-MÜHL, of London, England, have invented an Improvement in the Preservation of Grape-Skins by Concentrated Grape-Must; and I hereby declare the following to be a full, clear, and exact description of the same.

My invention relates to the art of wine-making, and especially to that branch of it which contemplates the making of wine at some future time and in other localities from grape-must previously prepared; and my invention consists in the preservation of grape-skins by treating them with their own concentrated juice or must.

The object of my invention is the preservation of grape-skins for an indefinite time for the purpose of wine-making, so that there may be obtained from the skins thus preserved and treated with their own concentrated grape-must the identical wine which would be obtained from the fresh grape-must.

In carrying out my process I first separate the grape-skins from the stems, the juice, and the seed by any of the usual crushing or separating appliances. I then press the skins by any suitable means, such as a hydraulic or mechanical press, so as to free them from the adhering juice, and dry them as much as possible without extracting the color contained in the organic cells of the skins or heating them. Instead of using a press for this purpose, I may separate the superfluous juice from the skins by centrifugal force applied by suitable machinery. In thus treating them preliminarily I avoid carefully the heating of the skins. The must or juice extracted from the grapes whose skins are prepared as above is subjected, by any suitable treatment and in any machine used for this purpose, to a concentrating process, so as to reduce it from a thin liquid, which it is when first extracted, to a liquid of a thicker consistence, and to thus concentrate it I prefer the process *in vacuo*. Having thus concentrated the grape-must, I place it in a suitable receptacle, so that I may readily mix the grape-skins with it in the manner I shall now describe. I pack the pressed grape-skins in a vessel, and by connecting one end of said vessel with the receptacle containing the concentrated must and exhausting the air from the vessel the concentrated must or juice is forced into the vessel containing the skins, so that they become saturated with it. In practice and for convenience in operating I would use a metallic vessel lined with tin, and of a slightly-conical shape, of the height of the barrel for shipping the skins. The ends of the vessel should be closed, one end being connected with a vacuum-pump and controlled by a valve, while the other end is connected with the receptacle containing the concentrated grape-must, the connection being controlled by a valve. Thus arranged, I extract the air from the vessel containing the grape-skins by operating the vacuum-pump, and at the same time, by opening the valve controlling its connection with the concentrated grape-must receptacle, the thick liquid or grape must enters every pore of the grape-skins. As soon as the vessel is filled with the concentrated grape-must I shut off the vacuum-pump and the connection with the vessel containing the concentrated grape-must. I then admit air to the interior of the vessel, and by removing the bottom of the same the grape-skins thus impregnated with the grape-must fall into a barrel placed beneath. I then fill the barrel with the concentrated grape-must, and it is ready for shipment.

I am aware marmalades and preserves have been made by preserving the skins with the concentrated juice; also, that it is not broadly new to pickle fruits by vacuum and pressure. I therefore do not claim such features, broadly, as my invention.

Having thus described my invention, what I claim as new, and desire to secure by Letters Patent, is—

1. The mode or method of preserving grape-skins which consists in first freeing them of the stems, the juice, and seeds, and the superfluous juice, so as to render them as free from moisture as possible without heating them, and in then mixing with them their concentrated juice or must, substantially as herein described.

2. The mode or method of preserving grape-skins which consists in rendering them as dry as possible without heating, and in then mixing them with their own concentrated juice or must, introduced to them by atmospheric pressure due to the exhaustion of the air from the vessel in which they are contained, substantially as herein described.

In witness whereof I have hereunto set my hand.

FERDINAND SPRINGMÜHL.

Witnesses:
S. H. NOURSE,
H. C. LEE.